United States Patent [19]

Devienne et al.

[11] 4,193,429

[45] Mar. 18, 1980

[54] PNEUMATIC TIRE INFLATION AND METHOD

[75] Inventors: André M. Devienne, Compiegne; Gilbert L. Igea, Clairoix; Jean-Pierre L. Bernard, Melicocq, all of France

[73] Assignee: Uniroyal, Clairoix, France

[21] Appl. No.: 797,149

[22] Filed: May 16, 1977

[30] Foreign Application Priority Data

Jun. 24, 1976 [FR] France .................. 76 19262

[51] Int. Cl.² ............................... B65B 3/04
[52] U.S. Cl. ......................... 141/4; 137/223
[58] Field of Search ............ 141/4, 36, 47, 67, 49, 141/392, 38; 152/415, 337, 341; 137/223

[56] References Cited

U.S. PATENT DOCUMENTS

| 2,898,969 | 8/1959 | Pfeiffer | 152/341 |
| 2,905,221 | 9/1959 | Nonnamaker | 152/341 |
| 3,126,936 | 3/1964 | Beckadolph | 152/341 |
| 4,054,169 | 10/1977 | Devienne et al. | 152/337 |

Primary Examiner—William D. Martin, Jr.
Attorney, Agent, or Firm—Ken Richardson

[57] ABSTRACT

A pneumatic tire inflation device and method is disclosed, the device comprising an arrangement of parts that enables its user to selectively gradually inflate a tire at a specified intermediate rate and pressure, and then to selectively suddenly continue such inflation at a substantially greater rate and pressure until complete inflation is achieved.

3 Claims, 8 Drawing Figures

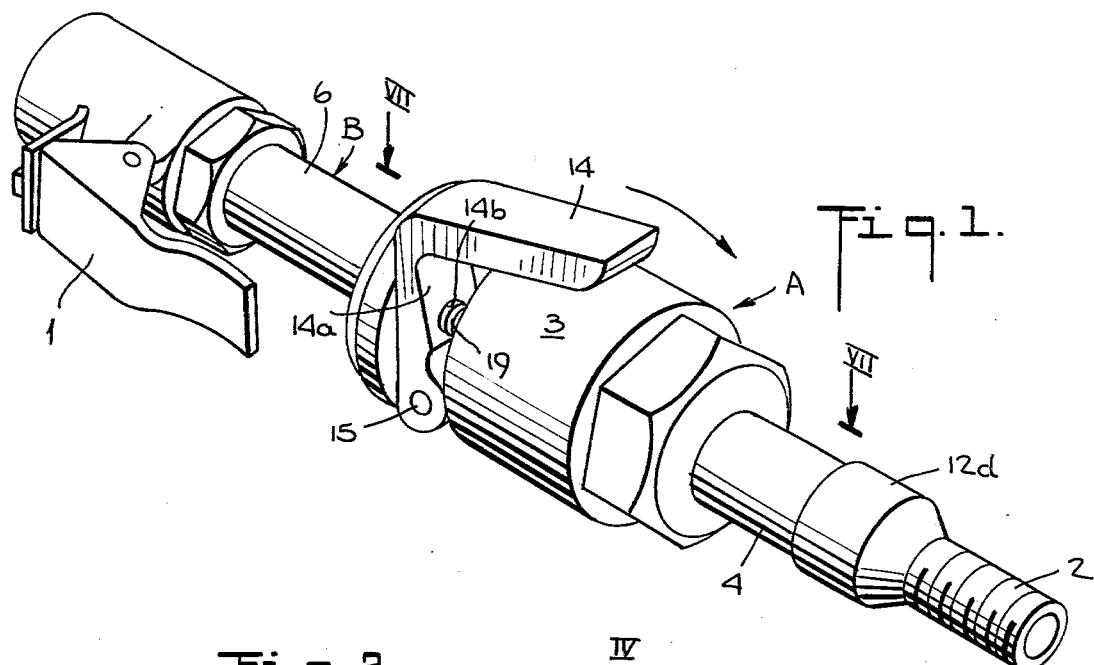
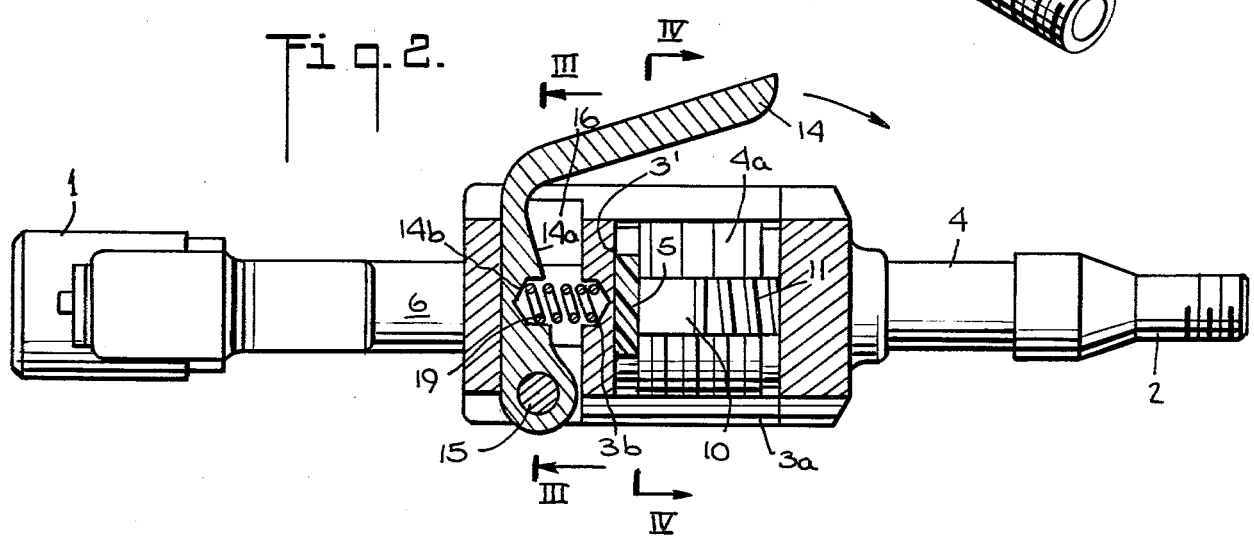
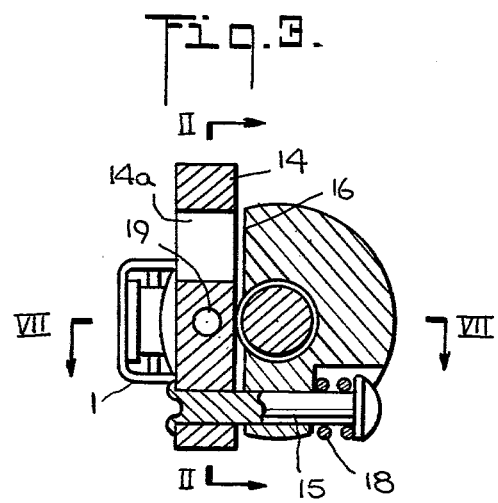
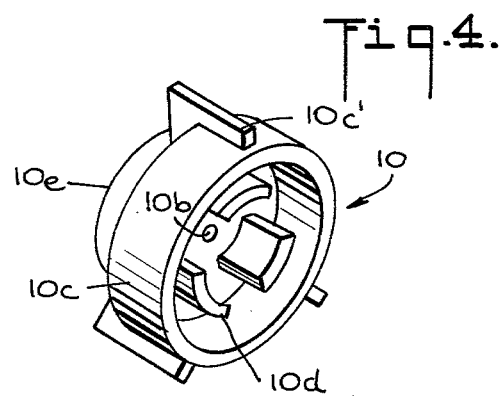

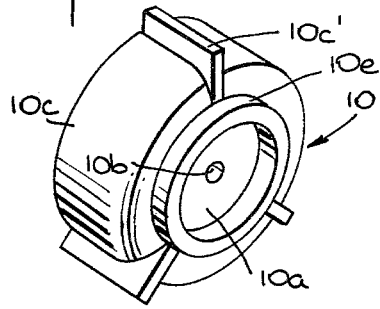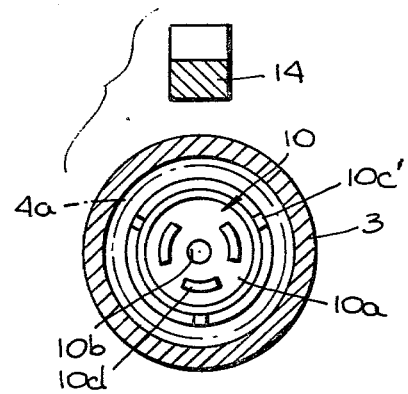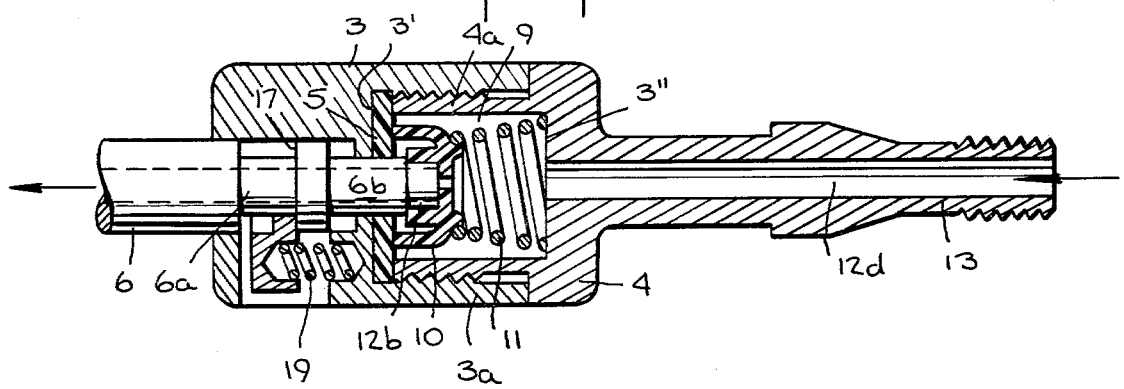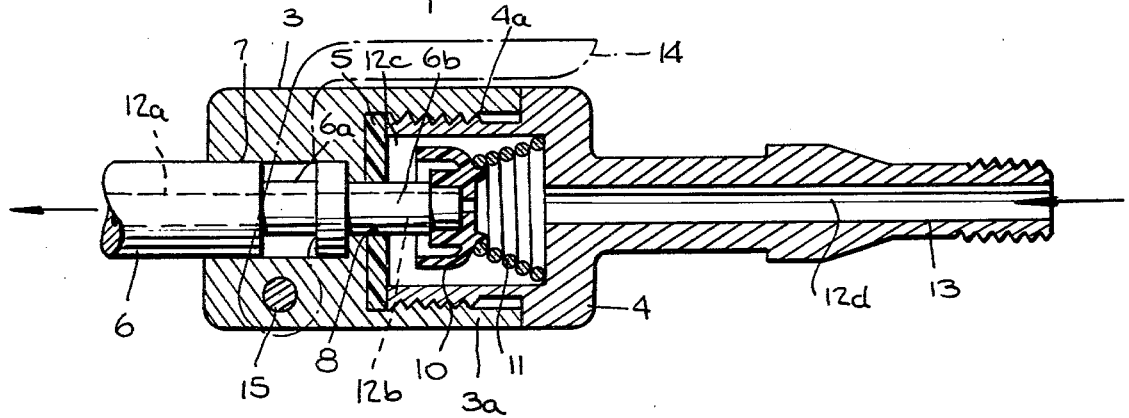

PNEUMATIC TIRE INFLATION AND METHOD

BACKGROUND OF THE INVENTION

The present invention generally relates to a system of inner tubes for a pneumatic safety tire that comprises a primary annular inner tube made of flexible material and provided with a conventional inflation valve designed to pass through the wheel rim, and a set of secondary inner tubes made of an elastically extensible material circumferentially surrounding the inner tube and connected to the latter by at least one special valve (as disclosed in copending U.S. Pat. application Ser. No. 703,339, filed on July 8, 1976 now U.S. Pat. No. 4,054,169, issued Oct. 18, 1977, and assigned to Uniroyal S.A., also the assignee hereof, which application is hereby incorporated by reference herein).

The special valve can automatically open in the direction of inflation and likewise in the direction of deflation, the valve also being capable of automatically closing the moment the pressure in the set of secondary inner tubes drops below that prevailing in the primary annular inner tube.

The aforesaid secondary inner tube is made as a single enclosure or, preferably, as a plurality of elementary enclosures such as bags or small balloons each one of which is connected to the primary inner tube by means of a respective special valve of the aforesaid type.

This inner tube system makes it possible, in the event of a puncture, to maintain the pressure prevailing within the inner tube, thereby making it possible to continue to use and travel on said tire when the secondary inner tube completely deflates as a result of the puncture. This results because the pressure imbalance produced between the primary inner tube and the secondary inner tube causes each aforesaid special valve to close automatically.

The above design does not, however, make it possible to overcome a puncture or air leakage resulting from a minute perforation or an inadvertent excessive porosity in the material of the secondary chamber because the pressure drop or reduction in the secondary chamber is very slow, and the aforesaid special valve is not sufficiently responsive to detect the slow air leak and pressure differential between the two aforesaid inner tubes. Thus, the special valves will not automatically close.

The present invention makes it possible to remedy this inadequacy by preventing the gradual deflation of the primary inner tube in the event of a fine perforation in the secondary inner tube or upon an inadvertent excessive porosity in the secondary inner tube.

SUMMARY OF THE INVENTION

The process of the invention, that makes it possible to prevent the deflation of the primary inner tube, is characterized in that it consists in operating as follows upon inflation of the inner tube:

(a) one slowly inflates the primary and the secondary inner tube unit up to an intermediate pressure below the ultimate pressure of the primary inner tube; and (b) one continues such inflation by suddenly increasing the pressure at the inlet of the inflation valve so as to bring about the closing of the special valve of the secondary chamber (if only one is present) or of each one of the special valves of said secondary chamber if the latter is made up of a plurality of small balloons.

Under these conditions, right after the inflating of the inner tube unit, be it at rest or during travel, the secondary inner tube is at a pressure substantially below that of the primary inner tube in such a way that:

(a) in the event that the secondary inner tube is made up of a single enclosure, the aforesaid special valve (or valves) remains closed; that is, even if the pressure in the secondary inner tube diminishes gradually as a result of a fine perforation or of a porosity in the said secondary inner tube; and (b) in the case that the inner tube is made up of a plurality of small balloons, the special valves corresponding to the respective small balloons remain closed even if the pressure drops gradually in certain ones of them as a result of the appearance of a porosity in their wall or of a fine perforation in the latter.

The aforesaid intermediate pressure can be situated in particular, in accordance with one characteristic of the instant invention, between 45% and 85% of the final pressure of the primary inner tube and, more specifically, between 50% and 70% of said final pressure. For instance, in the case of a final pressure P of the primary inner tube equal to 2.4 bars or atmospheres, the intermediate pressure to which the secondary inner tube is inflated will preferably be between 1.08 and 2.04 bars and, in a particularly preferred manner, between 1.2 and 1.68 bars.

The present invention also relates to a device constituting an adaptable connection between the inflation means and the inflation valve of the inner tube for the purpose of carrying the aforesaid process into effect.

This device is characterized in that it is constituted by a substantially tubular connecting piece (an adapter) adapting itself with one of its extremities to an inflation means of any conventional kind and, with its other extremity, to the valve of the inner tube that is to be inflated. The adapter has a passageway or a longitudinal cavity comprising two extreme or end sections each with low pressure drop, and two intermediate sections arranged parallel to one another, with each one thereof being connected to the downstream end section, that is to say, the section corresponding to the portion of the connecting element intended to be connected to the valve of the inner tube and, on the other hand, to the upstream end section of the said passageway. The intermediate sections comprise a section with a low pressure drop and a section with an elevated pressure drop, each one of which may comprise a calibrated duct or a calibrated aperture and a movable element whose actuation may be effected by a manually controlled means and which is suited to eliminate or to bring about the communication between the intermediate section with low pressure drop and the said end sections.

It will be readily understood that, if communication with the section with a low pressure drop is interrupted, the inflation air originating from the inflation means will be compelled to pass in succession through the upstream end section with a low pressure drop, the intermediate section with a large pressure drop, and the downstream end section with a low pressure drop so that there is brought about a rather slow inflation by virtue of the fact that all of the inflating air current must pass through intermediate section with a large pressure drop. Under these conditions, maximum inflation pressure cannot be attained. It is readily possible to stop this initial inflation stage at the aforementioned intermediate pressure. The actuation of the movable element then makes it possible to bring about communication between the intermediate section with the low pressure drop and the end sections of the longitudinal passageway of the connecting piece or adapter element, while the communication between the intermediate section with the large pressure drop and the said end sections can concomitantly be maintained or altered. Under these conditions, almost all of the air passes through a succession of sections all of which have a low pressure drop so that the initial inflation pressure can be obtained.

However, in accordance with a preferred mode of the instant invention, the aforesaid movable element is constituted by a cup-shaped element whose geometric axis is that of the connecting element, said cup-shaped element having a bottom comprising a short calibrated duct constituting the aforesaid intermediate large pressure drop section, and a continuous, peripheral, lateral wall connected to the periphery of the said bottom. Said movable element is capable of being axially moved forward and away from, as well as applied, along the extreme edge of the said continuous, peripheral, lateral wall, against a transverse wall of the said connection that is made substantially along the geometric axis of the said tubular connection by the upstream end of the downstream end section of the aforesaid longitudinal passageway with the external surface of the bottom of said cup-shaped element and the external surface of the aforesaid continuous, peripheral, lateral wall, that constitutes its extension, thereby limiting the downstream end of the upstream end section of the aforesaid longitudinal passageway.

Finally, according to another characteristic of the instant invention, the aforesaid connecting element or adapter is constituted by a downstream end portion and a main portion that are longitudinally movable one with respect to the other, the upstream end of the said downstream end portion being capable of axial displacement with the aforesaid movable or cup-shaped element in the direction of its movement away from the aforesaid transverse wall under the effect of aforesaid manually controlled means which are built up on the said main portion. The axial displacement of the said movable unit in the direction of its approaching of the aforesaid transverse wall or its application against the latter is achieved by means of elastic return elements associated with the said cup-shaped element.

Of course, the extreme downstream portion of the aforesaid tubular connecting element or adapter, which is designed to be fitted or connected to the inflation valve of the inner tube, is provided with means for hooking it onto the latter, which can be of any conventional type and which is used on conventional connecting elements.

BRIEF DESCRIPTION OF THE DRAWINGS

Other characteristics of the present invention will become apparent in the course of the description that follows taken in conjunction with the following drawings, in which:

FIG. 1 is a perspective view of a connecting element or adapter according to the preferred mode of the present invention;

FIG. 2 is a longitudinal cross-sectional view taken along line II—II in FIG. 3 of the connecting element;

FIG. 3 is a cross-sectional view taken along line IV—IV in FIG. 2 of the same connecting element;

FIG. 4 is a perspective view of the movable or cup-shaped element of the connecting element according to the present invention;

FIG. 5 is a perspective view of the cup-shaped element as viewed in a direction opposite that in which it is shown in FIG. 4;

FIG. 6 is a cross-sectional view taken along line VI—VI in FIG. 2;

FIG. 7 is an axial longitudinal section taken along line VII—VII in FIGS. 1 and 3 of the connecting element of FIG. 1 in its resting or at-rest state; and FIG. 8 is a view similar to FIG. 7 of the same axial longitudinal section the moment the aforesaid cup-shaped element is actuated by the said manually controlled means.

DETAILED DESCRIPTION OF THE INVENTION

Referring more particularly to FIGS. 1, 2, 7, and 8, it can be seen that the connecting element or adapter according to the instant invention comprises a main portion A and a downstream end portion B. The downstream end of the portion B is provided with a means 1 for being connected to the valve of an inner tube, said means being of any conventional type. Main portion A has an upstream end 2 that is designed to be connected to an air pumping means associated with, for example, a flexible hose.

The main portion A includes an element 3 terminating in a tubular portion constituting a female tip 3a, and an element 4 terminating in a tubular portion constituting a male tip 4a. The female tip 3a is internally threaded, whereas the male tip 4a is externally threaded for attachment to one another. A packing gland (or sealing disc) 5 is placed on the transverse wall 3' of the element 3 and constitutes the bottom of the female tip 3a, the packing gland (or sealing disc) 5 being clamped between the transverse wall 3' and the terminal edge of the male tip 4a.

The downstream end portion B includes a tubular element (or conduit) 6 comprising an intermediate portion 6a and a terminal portion 6b (FIG. 7), both of which are of smaller diameters than the element 6. The tubular element 6 projects into an axial borehole 7 of the element 3, which axial borehole 7 is extended by an axial borehole 8 of smaller diameter corresponding to that of a terminal portion 6b shown in FIGS. 7 and 8, the packing gland 5 being provided with an axial recess extending the borehole 8. Under these conditions, the end section 6b projects only slightly into a cavity 9 defined inside the inner space of the tip 4a at the state of rest of the connecting piece illustrated in FIG. 7, whereas the terminal section 6b projects to a greater extent into said cavity in the state of the connecting element illustrated in FIG. 8. The inner space of the tubular element 6 constitutes a downstream end section 12a, with low pressure drop, of the longitudinal passageway of the connecting element.

The connecting piece or adapter further comprises a movable element constituted by a cup-shaped (valve-acting) element 10 illustrated in FIGS. 4 and 5 and disposed in the cavity 9 as shown in FIGS. 7 and 8. The cup-shaped element 10 is made up of a bottom piece 10a comprising a short calibrated duct (or aperture) 10b that passes through the bottom piece 10a, a continuous, peripheral, lateral wall 10c connected to the periphery of the bottom piece 10a and provided externally with radial ribbings such as 10c', and a discontinuous lateral wall 10d of three spaced elements (spacer means) arranged inside of and coaxially with the continuous lateral wall 10c, the free edge of the elements of the wall 10d being recessed with respect to the free edge of the wall 10c. The discontinuous, peripheral, lateral wall 10d, which likewise is connected to the bottom piece 10a of the cup-shaped element 10, is made up of a plurality of elements separated by wide longitudinal slots, as illustrated. The outside diameter of the terminal portion 6b of the tubular element 6 is substantially equal to the external diameter of the wall 10d, thereby making it possible for the terminal portion 6b to brace against the said wall 10d so as to force back the cup-shaped element 10 and to move it away from the transverse wall 3' provided with the packing gland 5. On the opposite side of the continuous, peripheral, lateral wall 10d, the bottom piece 10a of the cup-shaped element 10 is connected to a raised edge 10e surrounded by one of the extremities of a return spring 11 urging the cup-shaped element 10 through the free edge of the wall 10c against the packing gland 5 the moment the tubular element 6 returns to its state of rest (FIG. 7) so that its terminal portion 6b projects only slightly into the cavity 9 as illustrated in FIG. 7, the other end of the elastic return spring 11 bracing against the transverse wall 3", on the upstream side, of the cavity 9.

The calibrated duct (or aperture) 10b and the inner space defined by the wall 10d together constitute an intermediate section 12b, with a large drop in pressure, of the axial longitudinal passageway of the connecting element. The portion of the cavity 9 situated between the external surface of the bottom of the cup-shaped element 10 and the transverse wall 3" constitutes, with the axial borehole 13 of the element 4, the upstream end portion (or conduit) 12d, with a low drop in pressure, of the axial longitudinal passageway of the connecting element.

With reference to FIG. 8, it can be seen that, in the position so illustrated, there exists a communication between the end sections 12a and 12d other than only through the intermediate section 12b. That is to say, communication is made within intermediate section (or chamber) 12c (of low pressure drop) of the axial longitudinal passage of the connecting piece, which section (or chamber) 12c is constituted by the space situated between the free edge of the wall 10c of the cup-shaped element 10, the space situated between the walls 10c and 10d of the cup-shaped element 10, the slots or spacings arranged between the three elements of the wall 10d and the space defined on the inside by the wall 10d.

The manual control means for the displacement of the tubular element 6 and of the cup-shaped element 10 are constituted by a manual control lever 14 pivotallymounted on an axis or pin 15 that is secured to the main portion A. That is, in this particular case, the element 3 of the connecting piece or adapter has a peripheral transverse spacing 16 in which is confined a portion of the lever 14 and the pin 15.

A face 14a (see FIG. 2) of the lever 14 is capable of bracing against and of forcing out a transverse shoulder (or flange) 17 situated at the upstream end of the intermediate portion 6a. The control lever 14 is provided with two return springs, namely the coil spring 18 surrounding the end portion of the shaft 15, and the helical spring 19 whose extremities are housed, respectively, in the cavities of the lever 14 and the element 3, that is to say, the cavities 14b and 3b, respectively.

The connecting element or adapter of the present invention, as illustrated in FIGS. 1 to 8, operates as follows:

(a) One initially secures the fastening and/or connecting means 1 of the adapter onto the inflation valve of an inner tube unit or assembly of the type described in the aforementioned copending U.S. application Ser. No. 703,339 which comprises a primary inner tube and a set of secondary inner tubes. The connecting piece or adapter should also be connected at its upstream end 2 to a conventional pumping means (not shown). Through the effect of the return springs 18 and 19 of the lever 14, and the return spring 11 of the cup-shaped element 10, the connecting element is initially in the state of rest illustrated in FIG. 7 in which the end sections 12a and 12d communicate with one another only via the intermediate section 12b having a high pressure drop by virtue of the calibrated passage 10b.

(b) The air pressure supplied by the pumping means makes it possible to inflate gradually the entire primary inner tube and secondary inner tube up to a certain pressure corresponding to the specified final pressure of the secondary inner tube.

(c) The moment this pressure, designated as "intermediate pressure", has been attained, one actuates the handle 14 by forcing and holding it against the external surface of the element 3 in such a way that the low pressure loss intermediate section 12c then establishes communication between the end sections 12a and 12d. The result is a sudden increase in pressure in the downstream section 12a because the actual longitudinal passageway as a whole of the connecting element is then constituted solely by sections having a low loss of pressure. This sudden increase in pressure brings about the closing of the aforementioned "special valve" connecting the secondary inner tube to the primary inner tube (or of each one of the "special valves" connecting the primary inner tube to the small balloons constituting the secondary inner tube). Therefore, the pressure is no longer subject to change within the secondary inner tube, whereas it continues to increase in the primary inner tube until it attains the specified final value. Inflation is then stopped under conditions identical to those of a standard inflation of an ordinary inner tube.

In the initial inflation stage, inflation is carried out up to an intermediate pressure of, for instance, 1.4 bars, which represents the final pressure of the secondary inner tube, whereas, in the final inflation stage, inflation is continued until achieving a pressure of 2.4 bars in the primary inner tube.

Under these conditions, the "special valve" (or valves) bringing about the communication of the secondary inner tube with the primary inner tube is closed under normal inflation conditions of the inner tube in view of the fact that the pressure in the secondary inner tube is substantially below that prevailing in the primary inner tube. In the event that there should occur a fine puncture in the secondary inner tube or in one of the balloons constituting the latter, or if there should exist a porosity in the said secondary inner tube, the aforesaid "special valve" (or valves) remains closed so that the gradual deflation of the secondary inner tube or of one of the balloons of the latter does not bring about any reduction in the inflation pressure of the primary inner tube, thereby making possible the continued use and travel on such a tire.

It is to be understood that the instant invention is in no way limited to the modes described and illustrated above as examples only. More particularly, the invention comprises all means constituting equivalents of the means described, as well as combinations thereof in accordance with the spirit and scope of the invention as claimed.

What is claimed is:

1. A method of inflating a pneumatic tire equipped with an inflatable, annular, inner tube, inflatable tube means surrounding said inner tube, first valve means intercommunicating and connecting said inner tube and said tube means to one another, said first valve means being adapted to open to allow the flow of a pressurized pneumatic fluid therethrough from said inner tube to said tube means, said first valve means being further adapted to close in response to a drop in pressure in said tube means below the pressure existing in said inner tube, and second valve means operatively associated with said inner tube for facilitating the inflation of said inner tube and of said tube means via said first valve means, said method comprising the steps of:

(a) gradually inflating said inner tube via said second valve means at a specified intermediate rate and to a specified intermediate pressure that is below a specified ultimate pressure to which said inner tube is to be finally inflated to so that said tube means is also inflated to said specified intermediate pressure via said first valve means; and thereafter (b) suddenly continuing inflating said inner tube to said specified ultimate pressure via said second valve means at a rate in excess of said specified intermediate rate and at a pressure in excess of said specified intermediate pressure at which said inner tube is first gradually inflated to, thereby, cause said first valve means to close and terminate the communication between said inner tube and said tube means.

2. A method as claimed in claim 1, wherein said specified intermediate pressure is between 45% and 85% of said specified ultimate pressure.

3. A method as claimed in claim 1, wherein said specified intermediate pressure is between 50% and 70% of said specified ultimate pressure.

* * * * *